US006757543B2

(12) United States Patent
Moran et al.

(10) Patent No.: US 6,757,543 B2
(45) Date of Patent: Jun. 29, 2004

(54) SYSTEM AND METHOD FOR WIRELESS DATA PERFORMANCE MONITORING

(75) Inventors: Brian Moran, Preston, WA (US); David A. Feinleib, Kirkland, WA (US); Charles Mount, Kirkland, WA (US)

(73) Assignee: Keynote Systems, Inc., San Mateo, CA (US)

(*) Notice: Subject to any disclaimer, the term of this patent is extended or adjusted under 35 U.S.C. 154(b) by 616 days.

(21) Appl. No.: 09/813,431

(22) Filed: Mar. 20, 2001

(65) Prior Publication Data

US 2002/0177448 A1 Nov. 28, 2002

(51) Int. Cl.[7] ............................................... H04Q 7/20
(52) U.S. Cl. ................................ 455/456.1; 455/67.11; 342/357.07; 342/357.1
(58) Field of Search ............................ 455/456.1, 67.1, 455/115.1, 466, 423, 426.1, 426.2, 428, 456.2, 456.3, 412.1, 412.2, 445, 550.1, 527, 73; 342/357.07, 357.1, 357.12, 357.13, 357.14

(56) References Cited

U.S. PATENT DOCUMENTS

| | | | |
|---|---|---|---|
| 6,178,331 B1 | * | 1/2001 | Holmes et al. ............. 455/466 |
| 6,185,427 B1 | * | 2/2001 | Krasner et al. .......... 455/456.2 |
| 6,185,433 B1 | * | 2/2001 | Lele et al. ................. 455/528 |
| 6,327,533 B1 | * | 12/2001 | Chou ......................... 701/207 |
| 6,490,443 B1 | * | 12/2002 | Freeny, Jr. ................ 455/406 |
| 2002/0072358 A1 | * | 6/2002 | Schneider et al. .......... 455/423 |
| 2002/0143916 A1 | * | 10/2002 | Mendiola et al. .......... 709/223 |

* cited by examiner

Primary Examiner—Cong Van Tran
(74) Attorney, Agent, or Firm—Blakely Sokoloff Taylor & Zafman LLP

(57) ABSTRACT

A method and system for monitoring wireless data service performance of wireless service providers. Data messages are sent from a plurality of remote and/or local monitoring probes to other monitoring probes. In general, the remote monitoring probes will be distributed throughout a service area(s) from the service provider and include both fixed probes and mobile probes, wherein each probe will include one or more wireless devices, including cellular phones, PSC phones, PDA devices, Blackberry devices, and the like. Various performance data are then measured, including message deliver latency and network accessibility. This data is then sent from the remote monitoring probes to one or more central monitoring stations, where it is stored and aggregated to generate performance reports and alerts, which are delivered to the service providers or may be accessed through a web user interface. In addition, wireless Internet access service performance is monitored using the remote and local monitoring probes, wherein various access functions are performed using WAP-enabled wireless devices.

59 Claims, 12 Drawing Sheets

SYSTEM AND METHOD FOR WIRELESS DATA PERFORMANCE MONITORING

BACKGROUND OF THE INVENTION

1. Field of the Invention

The present invention generally concerns wireless messaging and data services, and in more particular concerns a method and system for monitoring the data delivery performance of various wireless service providers, devices, and applications and automatically analyzing the monitoring results to provide recommendations to service providers to assist them in improving their wireless offerings.

2. Background Information

The use of wireless communications has grown at an astounding rate, and is predicted to continue to grow, with no end in sight. While most of the present bandwidth for wireless communications is used for voice traffic, more and more data is being sent over the airways, and the increased availability of wireless web contact and wireless messaging has placed increasing pressure on service providers.

While the demand for data access over wireless communications networks continues to escalate, the available bandwidth and quality of service provided by present wireless communications technology has not kept pace. Moreover, network complexity and diversity has increased, making the challenge of maintaining quality of service for wireless data networks, applications, and services even more difficult. As a result, network access is often delayed or even unavailable during peak usage periods, and connections are often dropped. It is predicted that these types of problems will only grow worse, leaving customers frustrated and unsatisfied.

The present market for wireless providers is highly competitive, with each provider seemingly offering more minutes for the same base rate every three to six months. In general, it is this selling point that is emphasized. In many instances, the cell phone a person purchased will only work with a certain provider, and those providers have recognized that once they get a new customer, that customer is likely to stay, at least on part because the customer doesn't want to throw away a perfectly good phone in order to switch to a new service provider. In addition, most service agreements are between six months and two years, with substantial penalties for dishonoring the agreement.

Marketing research indicates that many users would be willing to pay higher service fees for improved performance, e.g., shorter latencies and less dropped connections. In addition, it would be highly advantageous for those service providers that provide higher quality service to be able to advertise this fact when they are trying to attract new customers. While the service providers can publish performance results corresponding to their own criteria, there is no method that is available for objectively measuring the performance level of the various service providers. Accordingly, it would be advantageous to provide a bias-free means for measuring the performance of the various service providers in the wireless communications industry.

SUMMARY OF THE INVENTION

The present invention provides a method and system for monitoring wireless data service performance of wireless service providers. Data messages are sent from a plurality of remote and/or local monitoring probes to other monitoring probes. In general, the remote monitoring probes will be distributed throughout a service area(s) from the service provider and include both fixed probes and mobile probes, wherein each probe will include one or more wireless devices, including cellular phones, PSC phones, PDA devices, Blackberry devices, and the like. Various performance data are then measured, including message deliver latency and network accessibility. This data is then sent from the remote monitoring probes to one or more central monitoring stations, where it is stored and aggregated to generate performance reports and alerts, which are delivered to the service providers or may be accessed through a web user interface. In addition, wireless Internet access service performance is monitored using the remote and local monitoring probes, wherein various access functions are performed using WAP-enabled wireless devices.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention provides a method and system for monitoring the data delivery performance of various wireless service providers (also known as "carriers") and application providers over various timeframes and geographical regions. The method and system compile data corresponding to wireless data transfers, such a messaging, as well as wireless Internet access. This is accomplished through the use of a plurality of monitoring "probes" that are situated at remote locations throughout a service region being evaluated. The monitoring probes send and receive wireless data, and track performance criteria such as delivery latencies and network accessibility. Generally, some of the monitoring probes will be at fixed locations, while others will be mobile. Various performance data gathered by the monitoring probes are sent to one or more central monitoring stations, which may also send and receive wireless data and gather performance data. The various performance data is stored in one or more central databases and a report generator is used to produce tabulated reports and graphs containing performance data for the various service providers that are evaluated, as well as comparative data.

Figure 1:
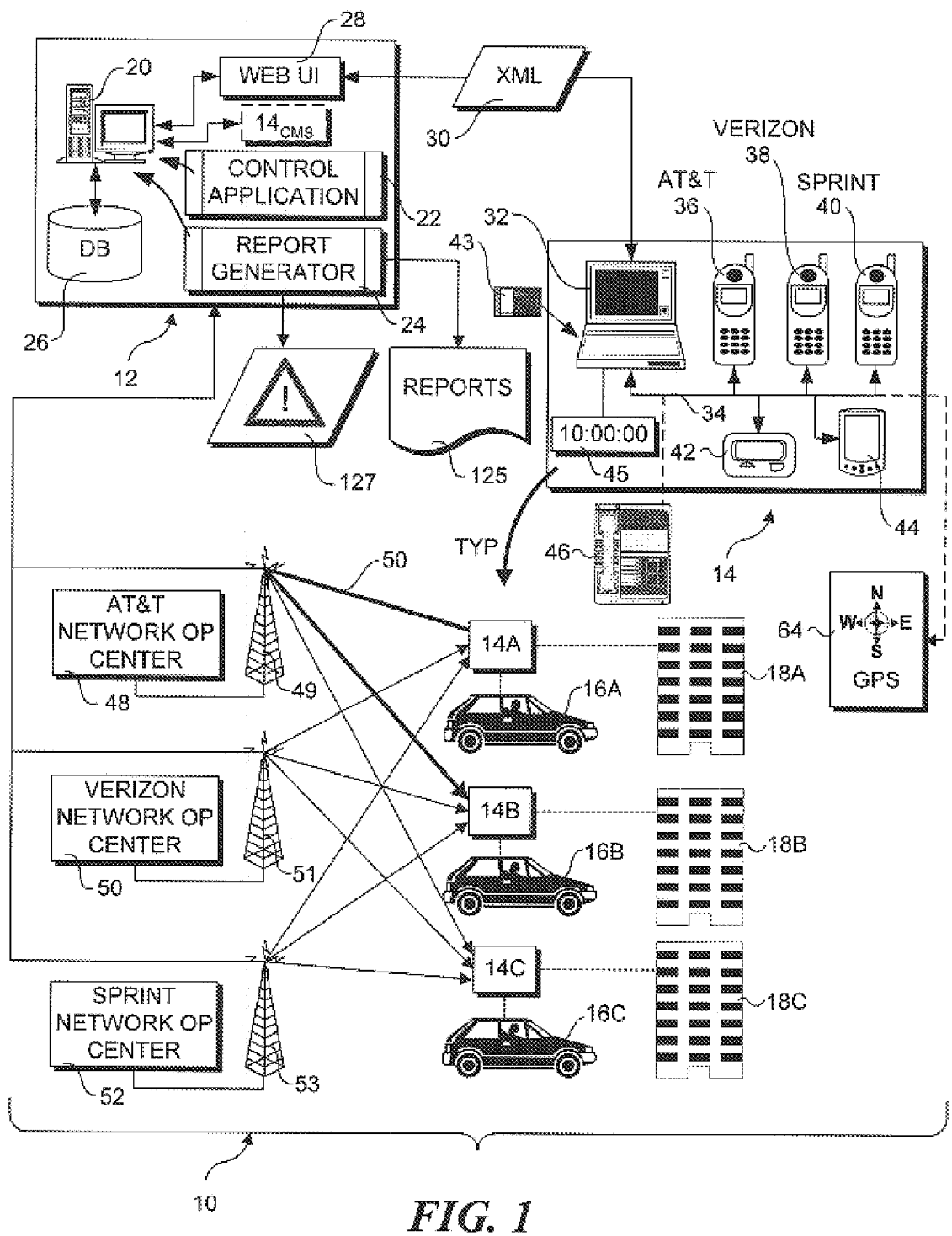
FIG. 1 is a schematic diagram illustrating a system for monitoring wireless message delivery performance of one or more service providers.

An exemplary wireless messaging performance monitoring system 10 for implementing wireless messaging performance measurement aspects of the present invention is shown in FIG. 1. System 10 includes a central monitoring station 12 that is linked in communication with a plurality of remote monitoring probes 14, wherein representative details of a typical monitoring probe are shown in a sub-system block 14, and instances of the remote monitoring probes are depicted as monitoring probes 14A, 14B, and 14C. As explained in further detail below, each of remote monitoring probes 14 may be mobile, as represented by vehicles 16A–C, or may be located at a fixed location, as represented by buildings 18A–C.

Central monitoring station 12 includes a server 20 on which a control application 22, and a report generator module 24 are running. Performance data and other data for the system are stored in a database 26 that is accessible by server 20. Preferably, database 26 will comprise an RDBMS (relational database management system), such as the SQL-based RDBMS databases offered by Oracle (Oracle 8i), Microsoft (SQL Server), Informix, and Sybase, or personal databases such as Access and Paradox. Central monitoring station 12 also includes a Web user interface (UI) 28, which provides bi-directional communication access to remote monitoring probes 14, preferably via XML data 30. As will be appreciated by those skilled in the art, this data may also comprise conventional HTML (HyperText Markup Language) data, as well as other common network data formats. Optionally, central monitoring station 12 may include a monitoring probe $14_{CMS}$ that comprises components substantially similar to that described below with respect to remote monitoring probe 14, except that these components are located in proximity to the central monitoring station.

Typically, a remote monitoring probe 14 will include a computer 32 that is linked in communication via a bus 34 with a plurality of wireless devices, including an AT&T Wireless cellular phone 36, a Verizon Wireless cellular phone 38, a US Sprint PCS phone 40, a pager 42, and a PDA (personal digital assistant) 44. Each remote monitoring probe 14 further includes a timeclock 45, which typically will be implemented in computer 32 itself; optionally, timeclock 45 may be a separate device linked in communication with computer 32.

It will be understood that PDA 44 includes various handheld devices that may receive wireless messages, such as wireless-enabled Palm Pilot devices (e.g., Palm VII) and Handspring Visor devices, as well as pocket PC's. Also, pager 42 is representative of two-way wireless pagers, as well as wireless e-mail devices, such as the "BlackBerry" wireless e-mail devices produced by Research in Motion (hereinafter "RIM" devices). Additionally, while the various wireless devices are depicted as being linked to computer 32 via a single bus 34, bus 34 may actually comprise individual links to those devices. For example, many wireless phones provide a data access port that may be linked to a computer via a serial or universal serial bus (USB) connection. Furthermore, while computer 32 is depicted as a laptop computer in FIG. 1, it may comprise a personal computer or workstation, especially if the remote generation station is located in a building, or may simply comprise a circuit board that is configured to perform the functions provided by computer 32 described below. Finally, the functionality provided by one or more of the various wireless devices depicted in sub-system block 14 may be performed by a RIM wireless card 43 that connects to computer 32 via a PCMCIA slot, enabling computer 32 to perform wireless data communication operations over a wireless network, such as Mobitex.

Figure 8:
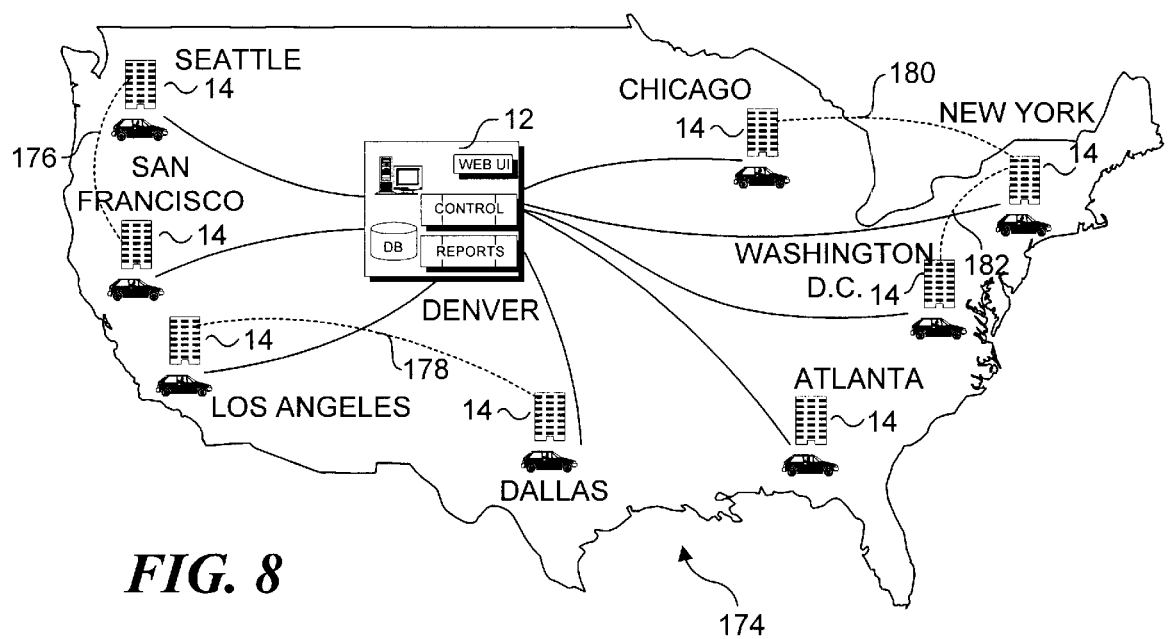
FIG. 8 shows an exemplary implementation of the monitoring system of the present invention, wherein one or more remote monitoring probes are distributed at various locations in each of a plurality of metropolitan areas in the United States.

It is envisioned that there will be one or more remote monitoring probes 14 located in the primary areas serviced by the various service providers being monitored, which will typically comprise different major cities/metropolitan areas throughout the United States (as shown in FIG. 8) and Canada, as well as other populous regions of the world, including Europe, various areas of Asia, South American, Africa, Asia, Australia, etc. In many of these service areas, such as the cities in the United States, a given wireless phone may only work with a particular service provider. For example, in major US cities, the wireless spectrum (i.e., the portion of radio frequencies designated for use by wireless devices) is divided in a manner in which certain service providers are allocated a particular piece of the "pie." Furthermore, PCS phones use a different frequency (~1900 Mhz), then most cellular phones (~800 Mhz), and there are different modes (analog, TDMA (time division multiple access) and CDMA (code division multiple access)) used by the phones. Accordingly, in most instances the wireless phone a US user purchases is configured to only work with a particular service provider. As a result, there generally will be a need to use more than one wireless phone for a given city in order to evaluate the performance of the various wireless service providers for that city, as depicted by AT&T Wireless cellular phone 36, Verizon Wireless cellular phone 38, and US Sprint PCS phone 40. The same may be true for other wireless devices, such as pagers 42 and PDAs 44. In addition, it will be understood that the various wireless devices depicted in subsystem block 14 are merely exemplary. Actual systems may employ more or less wireless phone devices using the same or different service providers, as well as multiple pagers and/or PDAs, depending on the wireless service providers for a particular area being evaluated and the type of messaging that is being performance tested.

Figure 2:
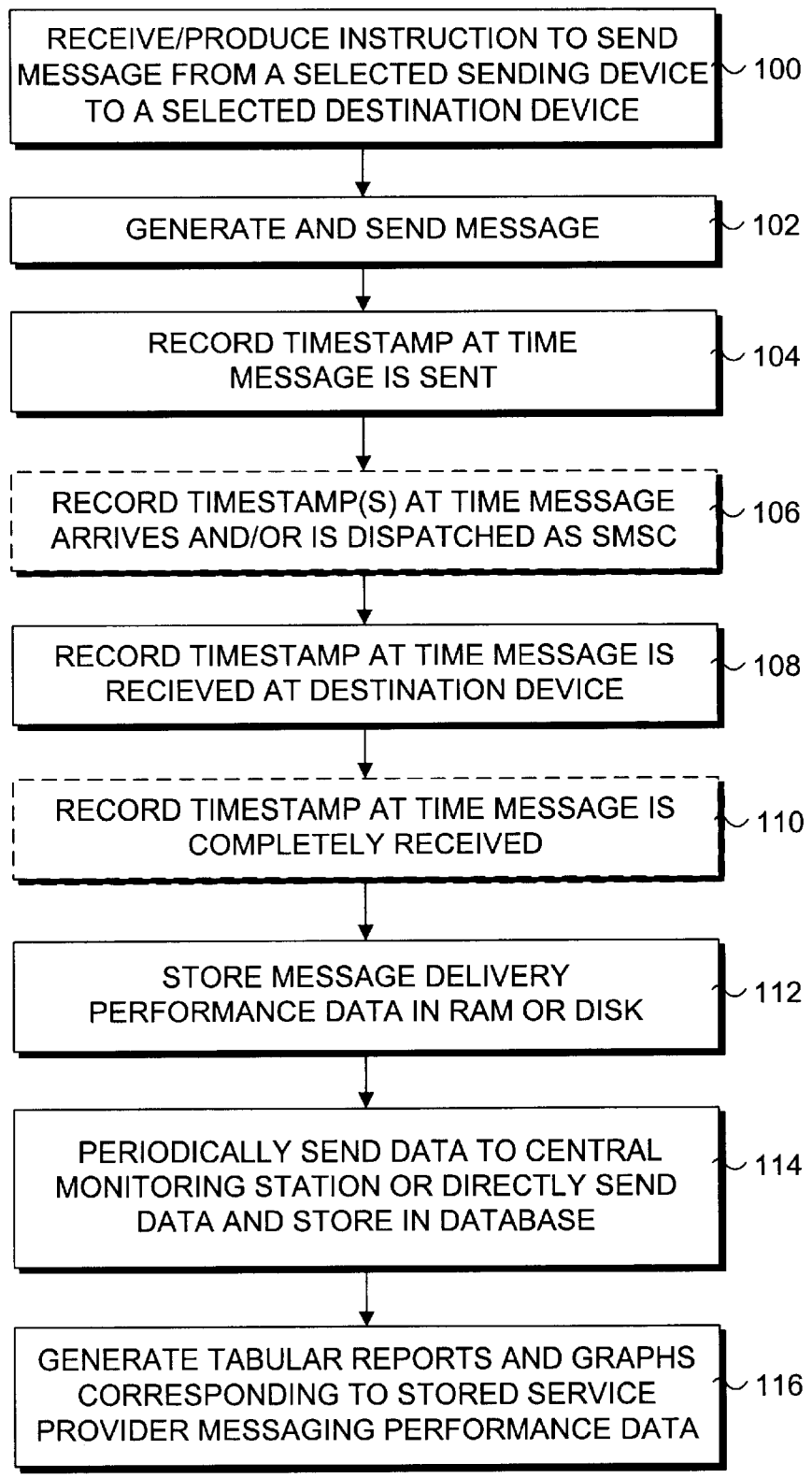
FIG. 2 is a flowchart illustrating the logic used by the system of FIG. 1 when monitoring the wireless message delivery performance of service providers.

Messaging performance monitoring system 10 works in the following manner, with reference to FIG. 1 and the flowchart of FIG. 2. A typical message delivery performance evaluation process is initiated in a block 100, wherein central monitoring station 12 sends out XML data 30 to one or more remote monitoring probes 14 comprising a request to send a message from a selected sending device to a selected destination device, as provided by a block 100. Optionally, computer 32 may be programmed to perform this function on a periodic basis, or this task can be performed manually at the remote monitoring probe. The sending device will comprise one of the wireless devices linked in communication with computer 32, i.e., one of wireless devices 36, 38, 40, 42, or 44, and may be associated with any of remote monitoring probes 14 or central monitoring station 12. The destination device may generally comprise another wireless device, which may be located at the same location as the sending device (e.g., both devices comprise part of the same monitoring probe), within the same city as the sending device, or in a different city and/or country from the sending device. Optionally, depending on the type of message and/or the service provider being evaluated, the destination device may comprise a network URL, e.g., a web site operated by an operator of system 10, or a land-based phone capable of receiving text messages, as depicted by an IP phone 46.

In response to the send message request, computer 32 sends data to an appropriate wireless device via bus 34 to generate and send a message to the destination device, as provided by a block 102, and a timestamp corresponding to the time the message is sent is recorded in a block 104 using timeclock 45. Preferably, the message will comprise a standardized message having a fixed length that is used throughout the performance testing of the various service providers being evaluated.

Suppose that the data messaging services provided by AT&T Wireless for a particular city, such as Seattle, are to be evaluated, and that the message will originate from remote monitoring probe 14A. Accordingly, a computer 32A sends data to AT&T Wireless cellular phone 36A to generate and send the message to the destination device using wireless communications infrastructure provided by AT&T Wireless, as depicted by an AT&T network operations center 48 and a cellular antenna 49. Similar network operation centers and cellular antennas for other service providers will also be used when those other service providers are monitored, as depicted by a Verizon network operations center 50 and a cellular antenna 51, and a Sprint network operations center 52 and a cellular antenna 53. It will be understood that for clarity only a single cellular antenna is depicted to represent the wireless network infrastructure for each of the service providers. As will be recognized by those skilled in the art, a service provider's wireless network infrastructure will comprise multiple cellular antenna's, and that portions of a service provider's network infrastructure may actually be operated by other service providers that offered shared usage of their equipment.

Depending on the geographical region being monitored, the destination device may comprise another device that uses the same service provider as the sending device, or the destination device may use a competing service provider, or no wireless service provider at all (e.g., a web site, or land-based phone). At present, there is no inter-service provider connectivity for data messaging in the United States. In other words, a wireless device that is serviced by a first service provider cannot send a data message to a wireless device that requires a second service provider. In contrast, this is not the case in Europe and other parts of the world. In these geographical regions, there is cross-connectivity provided by the service providers.

In one implementation of the data messaging performance-monitoring aspects of the present invention, the performance of various service provider networks is measured using data messages that only use infrastructure facilities provided by a single service provider. In other implementations discussed below, performance of data messaging services that span two service providers are evaluated.

Figure 3:
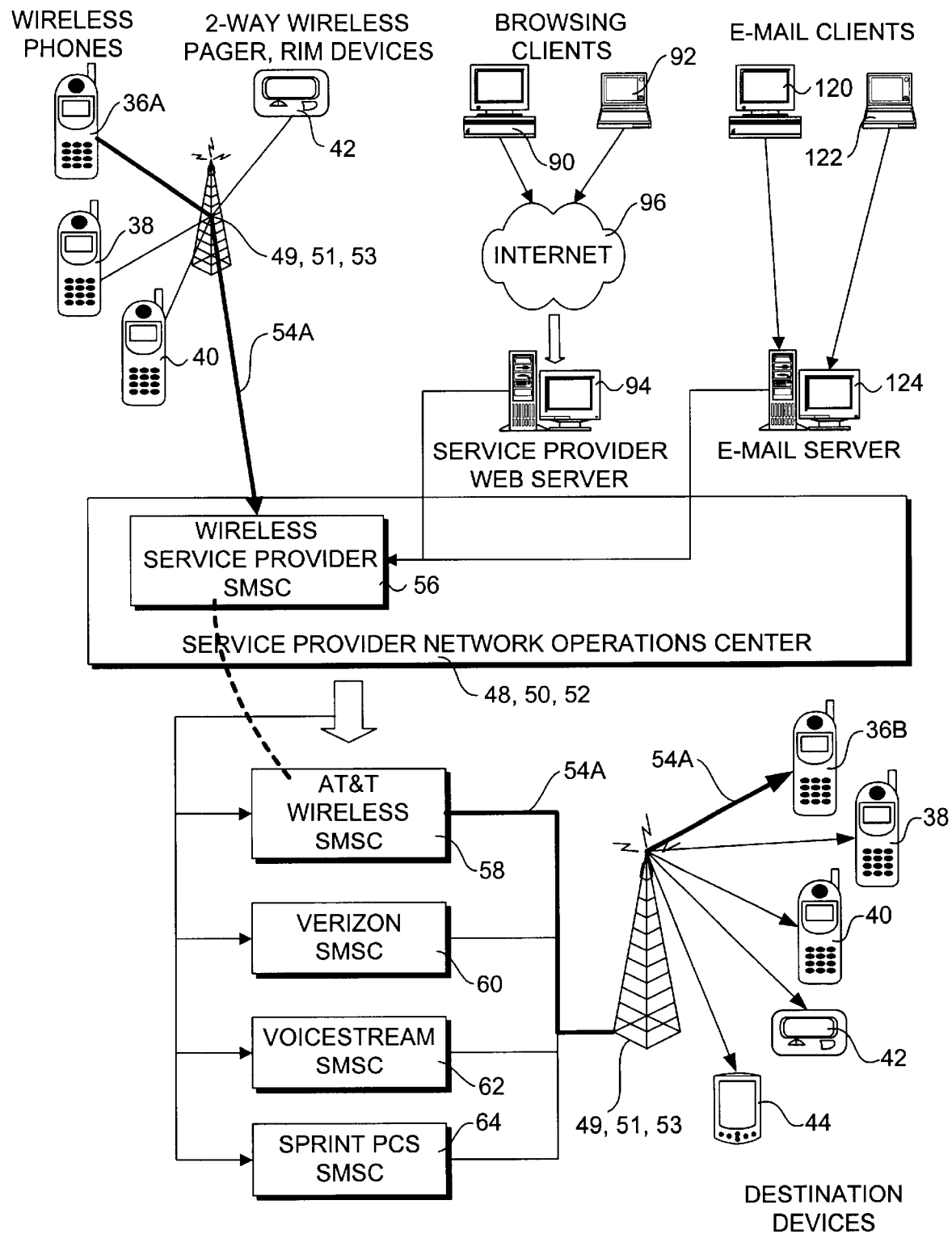
FIG. 3 is a schematic diagram illustrating various methods and corresponding routes for sending a wireless message from wireless and landline sending devices to a wireless destination device.

One advantage of conducting performance evaluations using a single wireless service provider for both the sending and destination devices is that the service provider generally cannot cast blame on another service provider for any latency or lack of network access. In accord with such a single service provider evaluation, suppose that the data message is sent from AT&T Wireless cellular phone 36A to an AT&T Wireless cellular phone 36B operated by a remote monitoring probe 14B. For simplicity, this is depicted as a communications path 54 in FIG. 1. However, as shown in FIG. 3, the actual path that is taken when sending a wireless message includes forwarding the message to a Short Message Service Center (SMSC) 56 that is operated by the service provider for the sending wireless device. As depicted in the Figure, the various SMSC functions for a particular service provider may be handled at one of the service provider's network operations centers. Optionally, the SMSC for the service provider may be a standalone facility.

In one implementation, a timestamp may optionally be recorded to mark the time the data message arrives at the SMSC and/or is dispatched for delivery from the SMSC to the destination device, as provided by a block 106. This can be perform using monitoring equipment that is configured to interface with equipment at the SMSC whereby latencies corresponding to the processing and dispatch of each message by that SMSC can be determined and recorded by storing timestamps and related message identification information with the monitoring equipment.

If the destination device uses the same service provider as the sending device, the message may then be sent to the destination device after being processed by the service provider's SMSC. For example, with respect to the foregoing single service provider example, a message is sent from AT&T Wireless cellular phone 36A via cellular antenna 49 to an AT&T Wireless SMSC 58, whereupon it is processed and sent to AT&T Wireless cellular phone 36B via a cellular tower proximate to the location of the destination cellular phone, as depicted by a path 54A. Similarly, each of the other service providers for a given area that provide data messaging services will also operate one or more SMSCs, as depicted in FIG. 3 by a Verizon SMSC 60, a VoiceStream SMSC 62, and a Sprint SMSC 64.

Upon receiving the message, a timestamp is recorded at remote monitoring probe 14B in a block 108. Optionally, a second timestamp corresponding to the time at which the message has been completely received by wireless phone 36B may be recorded in a block 110. In one embodiment, the time at which the message is initially received and completely received can be determined by polling the appropriate wireless device. Alternatively, each of computers 32A and 32B may be linked in communication over the internet or a private network (via a ground-based or wireless link, depending on whether the remote monitoring probes are mobile or at fixed locations), wherein the computer at the sending probe can advise the computer at the receiving prove that a message is forthcoming. In this instance, computer 32B could begin polling AT&T Wireless cellular phone 36B just prior to when the message is to be received, and monitor for the incoming message.

With respect to the foregoing timestamps, each respective timeclock 45 of the remote monitoring probes 14 will be synchronized such that the message delivery latency can be measured by subtracting the message send timestamp from the message receive timestamp. For example, if timeclocks 45 are provided by computers 32, the time for each of these computers can be updated remotely by central monitoring station 12 on a periodic basis so that they are synchronized using a single reference time, such as Greenwich Mean Time (GMT).

Returning to FIG. 2, performance data corresponding to each message is stored in a block 112. This data, which will generally include the phone numbers of the sending and receiving devices, the service provider (which may be identified by the phone numbers in a properly configured database schema), the time the message was sent and received, the amount of time it took to complete the delivery of the message (optional), timestamps for receipt and/or dispatch at the SMSC (optional), and an identifier that identifies the message that was sent. In addition, if the message was sent to or from a mobile remote monitoring probe, the location of the sending and/or receiving device, as applicable, will be provided. This functionality may be facilitated by a GPS (Global Position System) device 64 that is connected in communication to computer 32. Alternatively, a wireless phone with a built-in GPS, such as the GPS-1600 phone manufactured by Qualcomm, may be used.

As provided by a block 114, the data may be stored locally in computer 32 and downloaded periodically to central monitoring station 12, or may be sent directly to central monitoring station 12 as it is acquired. Upon receiving the data, central monitoring station 12 stores the data in database 26. Preferably, the database should be structured such that the location of fixed remote message generating/reception stations 32 can be identified by the phone numbers of the wireless devices used by that station. In addition, the database preferably should include service provider information that creates a relation between the phone number of each device and the corresponding service provider for that device.

In some instances, the data message will not be able to be sent because the network for the service provider(s) will be busy. This is because each cellular tower (commonly referred to as a cell) has a limited number of concurrent connections it can handle. For instance, for analog-based systems each cell can handle a maximum of 56 concurrent connections, while TDMA systems can handle a maximum of 168 concurrent connections, and CDMA systems can handle a maximum of approximately 450–560 concurrent connections. If the cell or cell(s) proximate to either the sending device or the receiving device are handling a maximum load, access to that service provider will generally be denied. In these instances, data will be recorded indicating that service was not available, wherein the particular parameters of the attempted connection (e.g., sending and receiving device phone numbers, time attempted, location of the devices, etc.) will be stored in the data message delivery performance record.

As discussed above, various geographical regions in the world, such as Europe, provide messaging cross-connectivity between service providers. It is anticipated that similar messaging cross-connectivity will soon be available in the United States. Accordingly, another aspect of message performance monitoring measures latencies and network availability by sending data messages along paths requiring multiple service providers.

Figure 4:
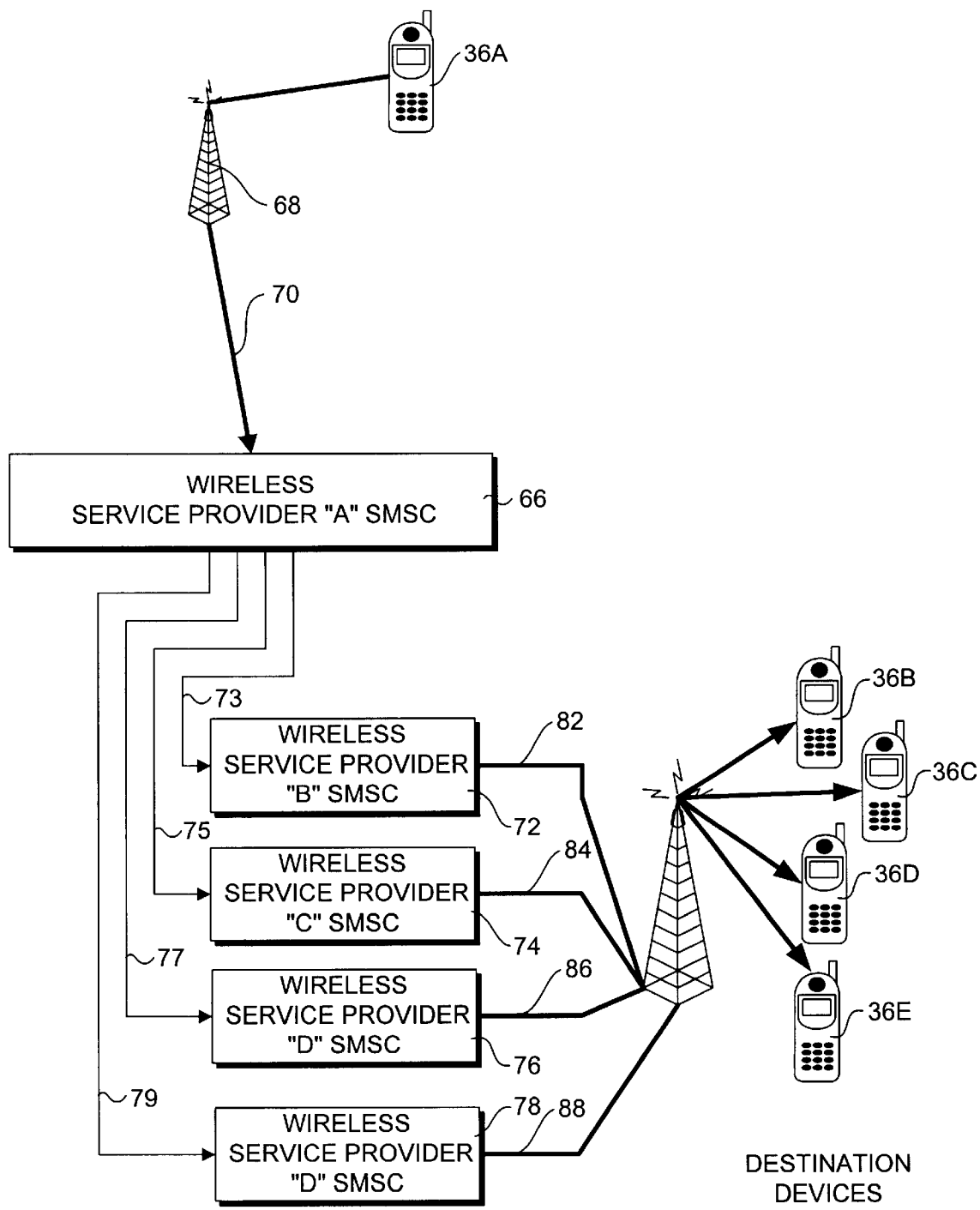
FIG. 4 is a schematic diagram illustrating various routes taken by wireless message sent from a single sending device to four destination devices having different service providers.

With reference to FIG. 4, an exemplary implementation of this aspect of the invention comprises sending a message from a cellular phone that has a service provider "A" to cellular phones having respective service providers "B", "C", "D", and "E." Accordingly, a plurality of respective message directed to cellular phones 36B, 36C, 36D, and 36E are sent from a cellular phone 36A to an SMSC 66 operated by wireless service provider "A" via a cellular tower 68, as represented by a path 70. Upon dispatch of each message, a timestamp for that message is recorded. Upon reaching SMSC 66, the message is processed, and the service providers of the destination devices for the respective messages are identified. The messages are then passed to the appropriate SMSCs for the various service providers of the destination devices, as identified by SMSCs 72, 74, 76, and 78, via respective paths 73, 75, 77, and 79. Upon reaching an appropriate SMSC, each message is processed, and is then sent to its respective destination device via a cellular tower 80, as depicted by paths 82, 84, 86, and 88, respectively. Upon reaching each destination device, a timestamp is recorded.

In one implementation, a similar set of messages may be sent through each respective service provider's SMSC to the destinations devices serviced by the other service providers, wherein the send and received time for each message is recorded. Preferably, these messages will be sent within a relatively short time frame between sending and destination devices that are substantially fixed in location. This will yield a set of total latencies corresponding to the respective messages that are sent. Each total latency will have two components: a first latency due to the processing and transmission of the message through the infrastructure of the sending device service provider, and a second latency due to the processing and transmission of the message through the infrastructure of the destination device service provider.

If a complete set of messages are sent, that is, if there is a set of messages sent through each service provider to the other service providers being evaluated, a set of simultaneous equations representing the latencies may be solved to yield the portions of the overall latency due to each service provider. These equations may be solved by several well-known methods, including linear algebra matrix inversion techniques. For example, suppose that there are three service providers, A, B, and C, and the resulting total latencies are measured, with the results shown in TABLE 1.

TABLE 1

| Sample No. | Sending Service Provider | Destination Service Provider | Total Latency (seconds) |
|---|---|---|---|
| 1 | A | B | 105 |
| 2 | A | C | 60 |
| 3 | B | A | 90 |
| 4 | B | C | 80 |
| 5 | C | A | 60 |
| 6 | C | B | 75 |

These result yield the following simultaneous equations:

$$A_S + B_D = 105 \tag{1}$$

$$A_S + C_D = 60 \tag{2}$$

$$B_S + A_D = 90 \tag{3}$$

$$B_S + C_D = 80 \tag{4}$$

$$C_S + A_D = 60 \tag{5}$$

$$C_S + B_D = 75 \tag{6}$$

wherein the subscripted "S" represents "SEND" and the subscripted "D" represents "Destination." The solution to the foregoing equations 1–6 is:

$$A_S=40 \quad (7)$$

$$A_D=30 \quad (8)$$

$$B_S=60 \quad (9)$$

$$B_D=45 \quad (10)$$

$$C_S=30 \quad (11)$$

$$C_D=20 \quad (12)$$

As exemplified by the foregoing results, in many instances the latencies for the sending services and destination services for the same service provider will not be equal. A similar set of equations and solutions can be derived from messaging performance data corresponding to any number of service providers in a given area.

In another embodiment, monitoring equipment can be configured to interface with equipment at the SMSC for one or more of the service providers, whereby latencies corresponding to the processing and dispatch of each message by that SMSC can be determined and recorded by storing timestamps and related message identification information with the monitoring equipment.

In addition to sending messages from wireless devices, messages can originate from land-based devices as well. As shown in FIG. 3, browsing clients 90 and 92 may access a service provider's web site hosted by a service provider web server 94 via the Internet 96. Upon navigation to an appropriate page on the web site, a user interface (UI) is provided that enables a user to send a text message to a selected wireless destination device by typing in the message in an edit box (or otherwise entering all or part of the message by pasting text into the edit box) and providing the phone number for the destination device. In response to a user selecting to send the message, service provider web server 94 processes the message and sends the processed message to its SMSC (i.e., wireless service provider 56 in FIG. 3), whereupon the message is routed to an appropriate cellular tower and delivered to the selected destination device.

In accord with the foregoing web-enabled wireless messaging scheme, performance data may be gathered to determine network latencies and availability. Preferably, computer 32 will be used to perform the function of browsing clients 90 and 92 above. For fixed location remote monitoring probes 14, computer 32 could be connected to service provider web server 94 via a land-based Internet connection. For mobile stations 14, a wireless connection would be required. In one implementation, a first timestamp is recorded when processing of the message begins on service provider web server 94 (i.e., at the point in time a "SEND" button or equivalent UI component is activated via a browser client running on computer 32), and a second timestamp is recorded upon delivery of the message to the selected destination device. In an alternative implementation, monitoring equipment at SMSC 56 could record the time the message was received and/or dispatched by the SMSC.

In some enterprise networks, e-mail clients are provided with direct access to wireless messaging services. One such configuration is illustrated in FIG. 3, wherein e-mail clients 120 and 122 are enabled to access SMSC 56 via an e-mail server 124. Generally, in such configurations, e-mail server 124 will be running one or more software applications and/or modules that are designed to interface with an SMSC 56 for one or more service provider. This software enables SMSC 56 to process messages in the same manner that is processes messages sent to it from wireless devices.

In a manner similar to the web-enabled messaging discussed above, computer 32 may be implemented to perform the functions of e-mail clients 120 and 122 by running appropriate e-mail client software on the computer, and by providing an appropriate connection (land-based or wireless) to e-mail server 124. Timestamps will then be recorded when a message is sent from computer 32 and when the message arrives at the selected destination device. As before, the e-mail client software enables a user to send a message through an appropriate UI, wherein the user enters text for the message and provides a phone number for the destination device. In some configurations, a significant portion of the latency for a message may be due to delay problems caused by the e-mail server. In order to compensate for this, monitoring equipment may be used at SMSC 56 to monitor for incoming messages, whereby the send timestamps will correspond to the times the SMSC receives respective incoming messages.

Figure 9:
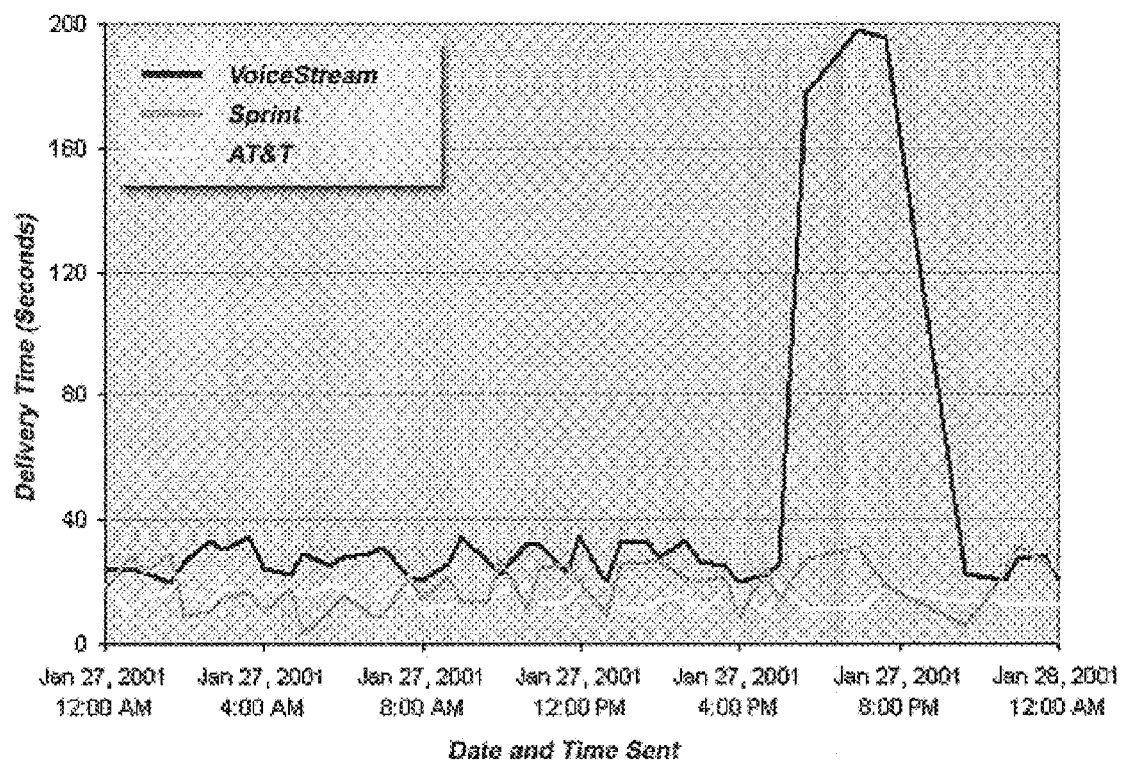
FIG. 9 is an exemplary report graph illustrating data messaging delivery latencies for three service providers over a one-day period.
Figure 10:
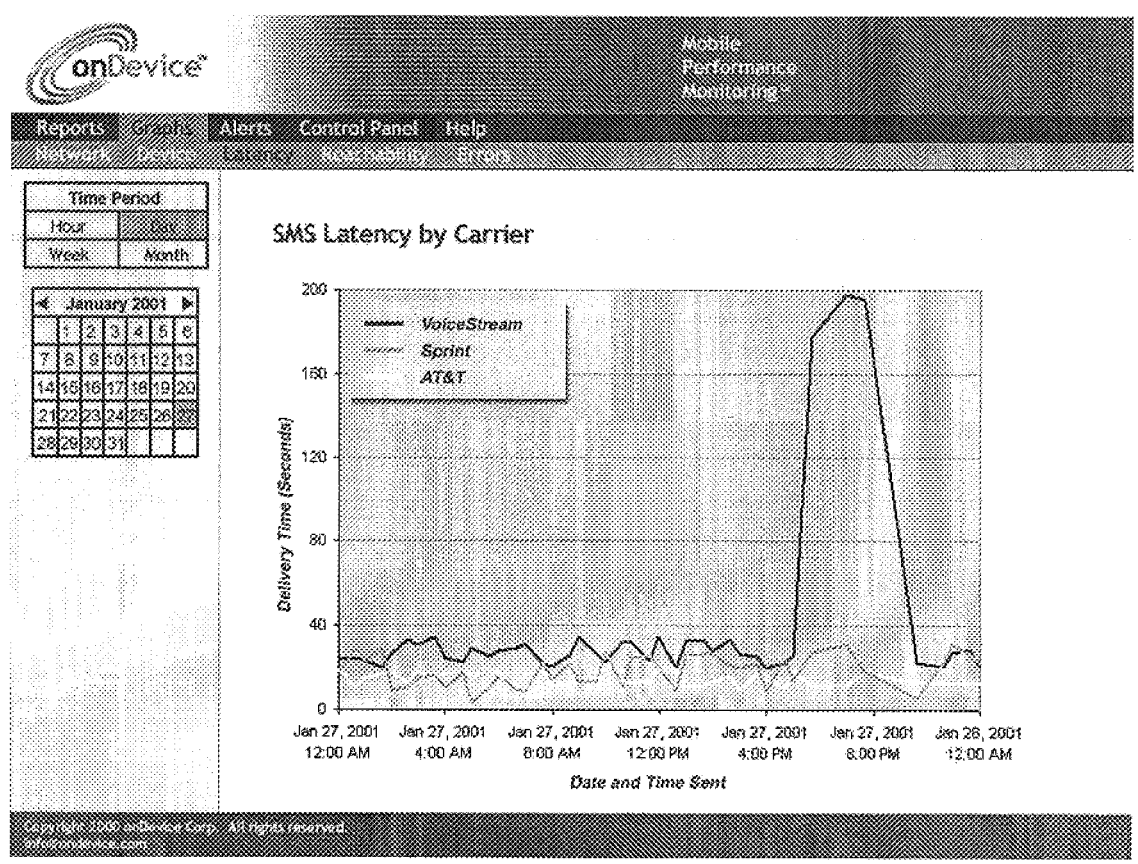
FIG. 10 illustrates a user interface that enables a user to produce various performance results based on input criteria selected by the user.

Returning to FIG. 2, on a periodic basis one or more reports 128 based on data stored in database 26 that were compiled during previous performance evaluations are generated by report generator 24. In general, reports 128 will comprise tabular reports and graphs that provide statistical information concerning message latency and availability by service provider, as well as comparison tables and/or graphs that comprise aggregated performance levels for the service providers in a given region. For instance, an exemplary graph 126 showing latency data for three service providers is shown in FIG. 9. Various well-known report generations tools may be used to generate the tabular reports and graphs, including Oracle Reports, and Crystal Reports. For personal databases, such as Access and Paradox, the report tools are built into the application.

Figure 11:
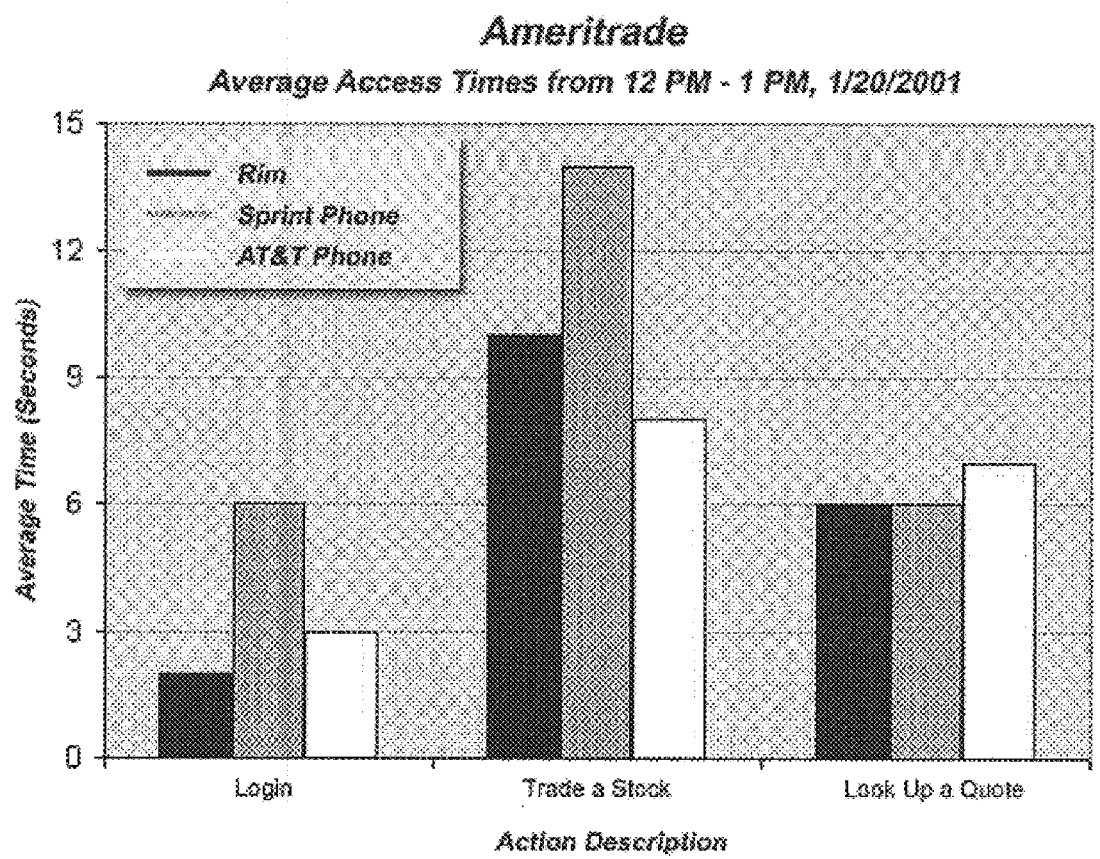
FIG. 11 is a barchart graph illustrating average wireless Internet access times to perform a scripted stock trade using a wireless Internet stock trading site.

Preferably, a report front end will be provided that enables the service providers, as well as other who are provided with access to the performance data, to view various reports and graphs based on selected criteria, including time periods and geographical areas. Such a front end may comprises one or more web pages, whereby users can access performance data via the Internet and Web UI 28 or be part of a standalone application that enables access to data through a private network connection. An exemplary user interface that enables users to select various parameters corresponding to the performance data the user desires to view is shown in FIG. 11.

Another aspect of the invention enables service providers and other network operators to be alerted when certain events occurs, such as message delivery latencies exceeding a predetermined threshold limits, lack of network access, etc. In one embodiment, report generator analyzes data in database 26 and generates an alert 127 when an alert criteria event is identified. Alert 127 is then sent to the appropriate service provider or network operator.

Figure 5:
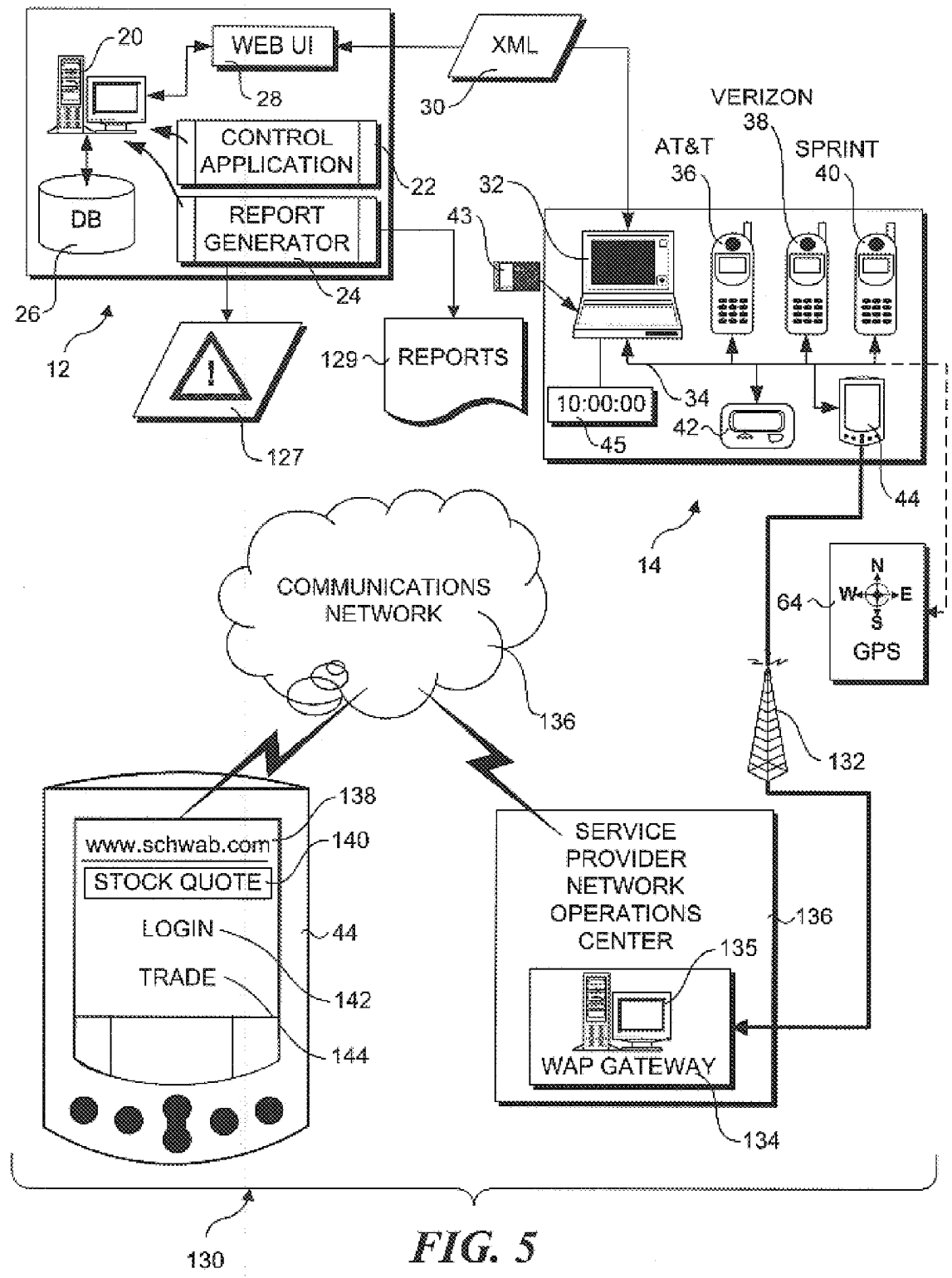
FIG. 5 is a schematic diagram illustrating a system for monitoring wireless Internet access performance of one or more service providers.

Further aspects of the invention concerns performance monitoring of wireless Internet access. An exemplary system 130 for implementing these aspects of the invention is shown in FIG. 5. In one embodiment, central monitoring station 12 and remote monitoring probes 14 comprise substantially the same components as presented above with reference to FIG. 1, with the exception that IP phone 46 is not required. In addition, one or more of wireless phones 36, 38, and 40 and each of pager 42 and PDA 44 will be WAP (Wireless Application Protocol)-enabled, thereby providing wireless Internet access to various sites on the Internet that provide data that can be browsed with WAP-enabled devices. Although not depicted in FIG. 5 for clarity, each of remote monitoring probes 14 may be operated from a vehicle 16 or a building 18 in a manner similar to that shown in FIG. 1.

WAP-enabled devices are enabled to access data from various Internet sites that provide content that is designed to be used by such devices. This data is generally delivered as Wireless Markup Language (WML) data to the device, as described in further detail below. WML comprises a special markup language that is designed to facilitate limited browsing capabilities in consideration of the low-resolution displays and limited navigation capabilities available on today's handheld devices, such as wireless phones, PDAs, and pocket PCs. WML includes HDML (Handheld Device Markup Language), and can trace its roots to XML (extensible Markup Language). It further comprises a Meta-language that supports user-defined extensions.

WAP-enabled devices are provided access to various web sites that provide wireless Internet content via a WAP gateway, which is implemented through the use of one or more WAP gateway servers. Generally, respective WAP gateways are operated by the various service providers in areas that support wireless Internet access, although it is possible for service providers to share WAP gateway facilities. In short, a WAP gateway server runs various software modules and/or applications that provide functions for facilitating interaction with WAP-enabled devices, including converting HTML (HyperText Markup Language) data retrieved via HTTP (Hypertext Transport Protocol) from web sites that support wireless Internet content into WML. These functions include a WAP encoder, script compiler and protocol adapters to convert the HTML data into WML.

To create wireless Internet content, a web site must create special text-only or low graphics versions of all or a portion of the pages on its site. At present, only a small fraction of Internet web sites provide wireless Internet content, although the number of these sites is expected to grow exponentially as more and more people acquire WAP-enabled devices. A primary reason for this text-only or low graphics content is that WAP enabled devices generally provide very small low-resolution screens, and typical wireless data transfer rates are much lower than the data-transfer rates available via land-based networks. It is noted that although most present wireless Internet content comprises HTML that must be converted into WML at the WAP Gateway, there are many web sites that provide data that is already in WML directly to the WAP Gateways.

A typical WAP session works as follows, with reference to FIG. 5. A user operating a WAP-enabled device, such as PDA 44, opens a "minibrowser" (the WAP client for the session), which then sends out a radio signal via PDA 44's wireless modem searching for WAP service. In response, a connection is made with a service provider the user has a wireless Internet access subscription service with, via a nearby cellular tower 132. The user then selects a web site the user would like to view by entering the URL for the web site through a UI provided by the minibrowser. In this example, the user enters the URL for the Charles Schwab online site, "www.schwab.com," as indicated by reference numeral 138 in the enlarged depiction of PDA 44 in FIG. 5. A request to access the site is then sent from PDA 44 to a WAP Gateway 134, which typically will be operated at one of the service provider's network operation centers 136. A WAP Gateway server 135 retrieves the information corresponding to the URL, typically as HTML data, via HTTP from the web site, and encodes the HTML data into WML (Wireless Markup Language). As discussed above, for some Internet sites the data may already be in WML format, so no HTML-to-WML encoding will be required. The WML data is then sent from WAP Gateway server 135 back to PDA 44 via cellular tower 132. In a manner similar to conventional browsing, the user is enabled to browse various pages on the site by activating appropriate UI components presented to the user via the minibrowser, whereby a similar process to that discussed above is performed in response to the user interactions to present content corresponding to that selected by the user.

Figure 6:
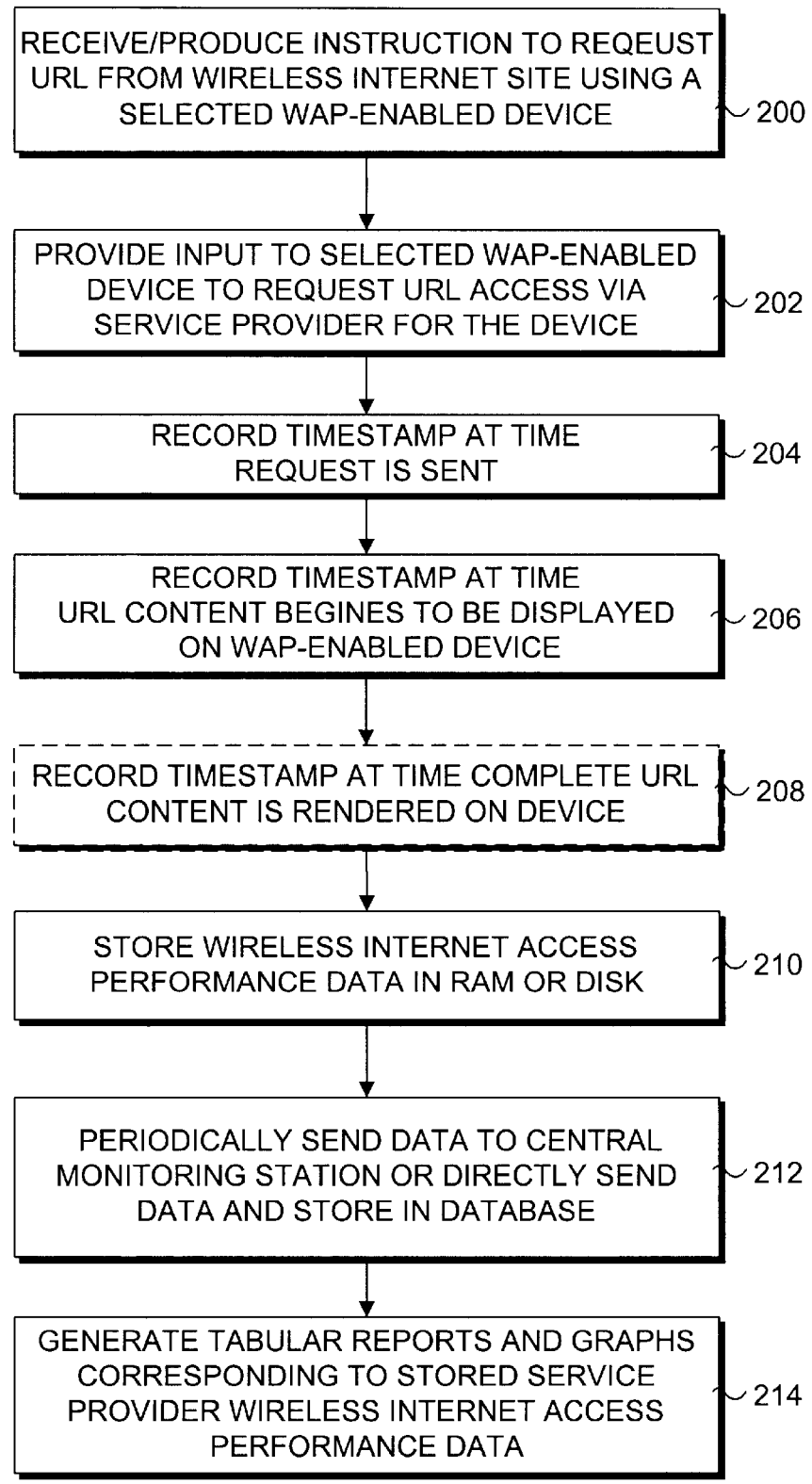
FIG. 6 is a flowchart illustrating the logic used by the system of FIG. 5 when monitoring wireless Internet access performance of service providers.

As depicted in FIG. 6, one aspect of measuring wireless Internet access is performed as follows. In a block 200, an instruction is either received by computer 32 from central monitoring station 12 or provided by an application running on computer 32 to have a selected WAP-enabled device request access to a URL corresponding to an Internet site that provides wireless Internet content. Next, in a block 202 the selected WAP-enabled device is programmed to request access to the URL from the service provider that provides wireless Internet access for the device. This can be done either manually, or by providing appropriate input commands from computer 32 to the selected WAP-enabled device.

Upon sending the request, a timestamp is recorded in a block 204. The request is handled by the service provider, who retrieves data content from the site corresponding to the URL, processes the data, and provides corresponding WML data back to the selected WAP-enabled device. Upon receiving the data, the minibrowser running on the device begins to render the content. In a block 206 a timestamp is recorded corresponding to this event. Optionally, another timestamp is recorded in a block 208 corresponding to a time the content has been fully rendered by the minibrowser.

As these timestamps are taken, data is stored in computer 32 (e.g., in RAM or on disk) corresponding to the current wireless Internet access performance evaluation. Such data will typically include the URL, identification of the WAP-enabled device, the service provider, and the type of test being performed. These functions are provided by a block 210. In a block 212, the wireless Internet access data is sent to central monitoring station 12. In a manner similar to that discussed above for the messaging performance evaluation, the wireless Internet access performance data may be sent periodically to central monitoring station 12, or sent as it is acquired. Upon receiving the data, central monitoring station 12 stores the data in database 26. In a block 214 the various results are then processed by report generator 24 to produce various tabular reports and/or graphs depicting various performance criteria for the service providers that are evaluated, as depicted by reports 129. An exemplary report indicating average access times for performing various accesses via an Ameritrade WAP site is shown in FIG. 11. Additionally, in a manner similar to that discussed above, report generator 24 also may produce alerts 127 and send the alerts to service providers and network operators when predetermined alert conditions are identified.

In addition to accessing a single URL, the invention enables a scripted set of access functions to be performed and corresponding performance data recorded corresponding to completion of those functions. For example, one common reason for users to acquire WAP-enabled devices is so that may make stock trades wherever they are. In many instances, the time it takes to execute a trade is critical, especially in the options markets. In making trade determinations, the current price of the stock is another concern to the user. Accordingly, it would be valuable to measure how long it takes to make a trade on a particular online stock brokerage site, both using different service providers, and for comparing competing stock brokerage sites. It would also be valuable to determine how long it takes to obtain a stock quote.

In view of the foregoing criteria, the present invention enables scripted sessions to be performed using a WAP-enabled device, wherein a particular sequence of wireless Internet content is retrieved. In one exemplary use, a script is processed to obtain a stock quote. For example, a WAP-enabled device, such as PDA 44, is programmed to access the URL for a stock brokerage site that provides wireless Internet content, such as www.schwab.com, in a manner similar to that discussed above. As before, a timestamp is recorded at the time the first request for access to the site is sent from the WAP-enabled device. This will cause the microbrowser to render a display page on the WAP-enabled device, such as that shown in FIG. 5. The display page will contain one or more user options, such as a "STOCK QUOTE" option 140, a "LOGIN" option 142, and a "TRADE" option 144. Via the script, the WAP-enabled device will then activate a scripted option, such as "STOCK QUOTE" option 140. Activation of this option will return new content that includes an edit box in which the stock symbol may be entered (not shown). A request for a stock price quote corresponding to this symbol will then be issued, and the stock price will be rendered by the microbrowser. At this time, another timestamp is recorded.

In another implementation, a scripted stock trade is performed. In this instance, the script will activate "TRADE" option 144. In response, the system will provide one or more screens that enabled scripted information to be provided for executing the trade, such as a user's login identification, the stock symbol for the stock to be traded, and the number of shares requested. Additional timestamps are then recorded when a "execute trade" is activated and when confirmation that the trade has been executed is rendered by the microbrowser. Preferably, a similar script will be run using WAP-enabled devices that have different service providers, as well as access to different online brokerage sites that provide wireless Internet content.

In the foregoing description, PDA 44 was used as an exemplary WAP client. It will be understood that other WAP clients, such as WAP-enabled wireless phones, may also be used to evaluate wireless Internet access performance content for the various service providers that are being tested. In addition, other types of scripted events, such as access to an e-mail account, purchase of an item via an on-line store, etc. may be performed in a similar manner to that discussed above with respect to the stock brokerage site.

In the foregoing implementations, various wireless devices are programmed to perform certain tasks. Programming of the wireless devices may be performed using appropriate computer interfaces, which are collectively depicted by bus 34, or through manual interaction, depending on the characteristics of the particular wireless device being used.

Figure 7:
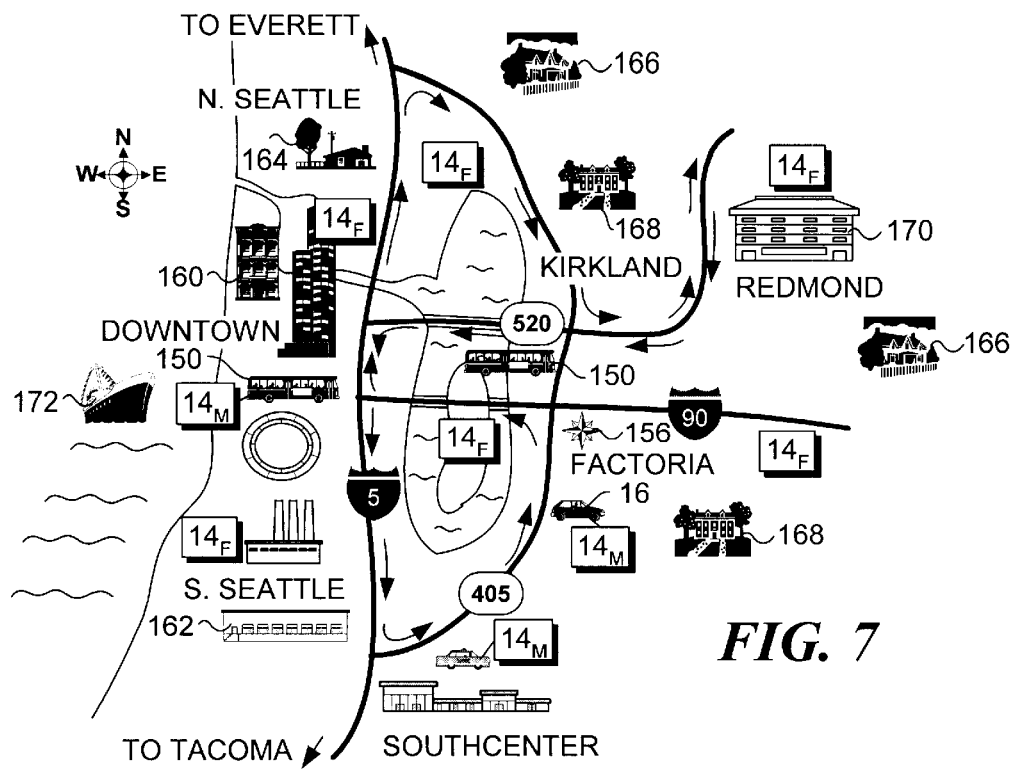
FIG. 7 shows an exemplary metropolitan area and route driven by one or more vehicles during data deliver monitoring of wireless messaging and/or wireless Internet access performance.

One objective of the performance monitoring is to provide data that corresponds to aggregated user experiences when using the data access features of various wireless service providers for each area being evaluated. Accordingly, it will generally be desired to gather performance data from different locations within each area being evaluated. One way of accomplishing this objective is to use a plurality of remote monitoring probes 14 throughout fixed location in a city or metropolitan area. Such an implementation is illustrated in FIG. 7, wherein a plurality of remote monitoring probes 14F are located in different fixed locations throughout the greater Seattle area. In such implementations it will generally be desirable to connect each of the remote monitoring probes 14 with a central monitoring station 12 using land-based network connections. Furthermore, central monitoring station 12 used may be located in or near the area being evaluated, or at a remote location in another state or country.

Since many wireless users access data from their vehicles, it will also be desirable to conduct performance monitoring from remote monitoring probes located in moving vehicles. This implementation is also illustrated in FIG. 7, wherein mobile remote monitoring probes 14M are located in a car 150, buses 152, and a taxi 154. There are different types of data sets that can be accomplished by using different types of vehicles. For example, since buses run on fixed routes, data for particular locations at certain times of day can be readily gathered by remote monitoring probes located in buses. Conversely, since taxis generally do not drive along fixed routes, more randomized data will generally be gathered by remote monitoring probes located in taxis.

In other implementations, it will be desired to gather data for certain locations at various times during the day. This can be accomplished by driving a car along a selected route, such as that depicted by the arrows in FIG. 7. For example, a car 16 with a mobile remote monitoring probe 14M on board could start from a start point 156 near Factoria and drive West toward downtown Seattle, turning north onto I-5 and continuing to head North through North Seattle until reaching 405. At this point, car 16 would turn right and head South on 405 until reaching 520, whereupon the car would head east toward Redmond. Car 16 could then go to the end of 520 and turn around, heading back West on 520 toward downtown Seattle again. Upon reaching I-5, car 16 would turn South and head toward Tacoma until reaching 405 near Southcenter, whereupon the car would head north on 405 back to start point 156. This drive pattern, as well as similar drive patterns, could be repeated continually throughout the day, or started at selected times throughout the day. The basic idea is to cover a majority of the local service areas for the providers during different time periods, so that data can be gathered corresponding to user experiences at the different locations and time periods in the local service area.

Preferably, data from both fixed and mobile remote monitoring probes 14 will be gathered for the local service provider areas being evaluated. In addition, it will generally be desired to gather user experience data from a diverse range of locations, including downtown skyscrapers 158, historical areas 160, industrial areas 162, moderate income areas 164, rural areas 166, upscale neighborhoods 168, and suburban office parks 170. In areas near waterways, data may also be gathered from maritime traffic 172.

Once the data is gathered and stored in database 26, the data can be mined, looking for both objective performance indicators, as well as datasets that are more difficult to observe on a first inspection. For instance, a carrier's aggregated performance for a local service area may yield moderately good results, while portions of the local service area receive much poorer service. Typically, reports 128 and 129 will be generated on a somewhat periodic basis, wherein the reports and graphs preferably will be designed to clearly indicate both absolute and relative performance levels of the various wireless service providers in the area being evaluated. Preferably, report generator 24 will monitor for alert conditions on a near-realtime basis.

As discussed above, it will be preferable to evaluate at least the major metropolitan areas in the geographic regions covered by the various carriers. Such a geographical implementation 174 is illustrated in FIG. 8, wherein one or more remote monitoring probes 14 are located in each of Seattle, San Francisco, Los Angeles, Dallas, Atlanta, Chicago, New York City, and Washington D.C. In geographical implementation 174, each of remote monitoring probes 14 sends data they compile to a central monitoring station 12 located in Denver. As discussed above, the central monitoring station could be located in any city, as well as cities in another country. Furthermore, there may be implementations wherein more than one central monitoring station is used, whereby the data sent to those central monitoring stations could be kept in separate databases 26, or forwarded to a central database.

Another aspect of the invention concerns measuring intra-carrier long distance messaging service performance, as illustrated by long distance connection paths 176, 178, 180, and 182 in FIG. 8. In accord with this aspect, long distance wireless messaging performance data is gathered for service providers such as Sprint, Verizon, AT&T, Voicestream, Nextel, MCI Worldcom, and others that provide single service provider access between cities, i.e., they enable wireless messages to be passed between wireless devices located in diverse geographical regions without requiring the infrastructure of any other carrier. Accordingly, measurements are conducted in a similar manner to that discussed above for messaging within a local service area, except that the remote monitoring probes 14 performing the measurements are located in different service areas, e.g., separate cities.

Figure 12:
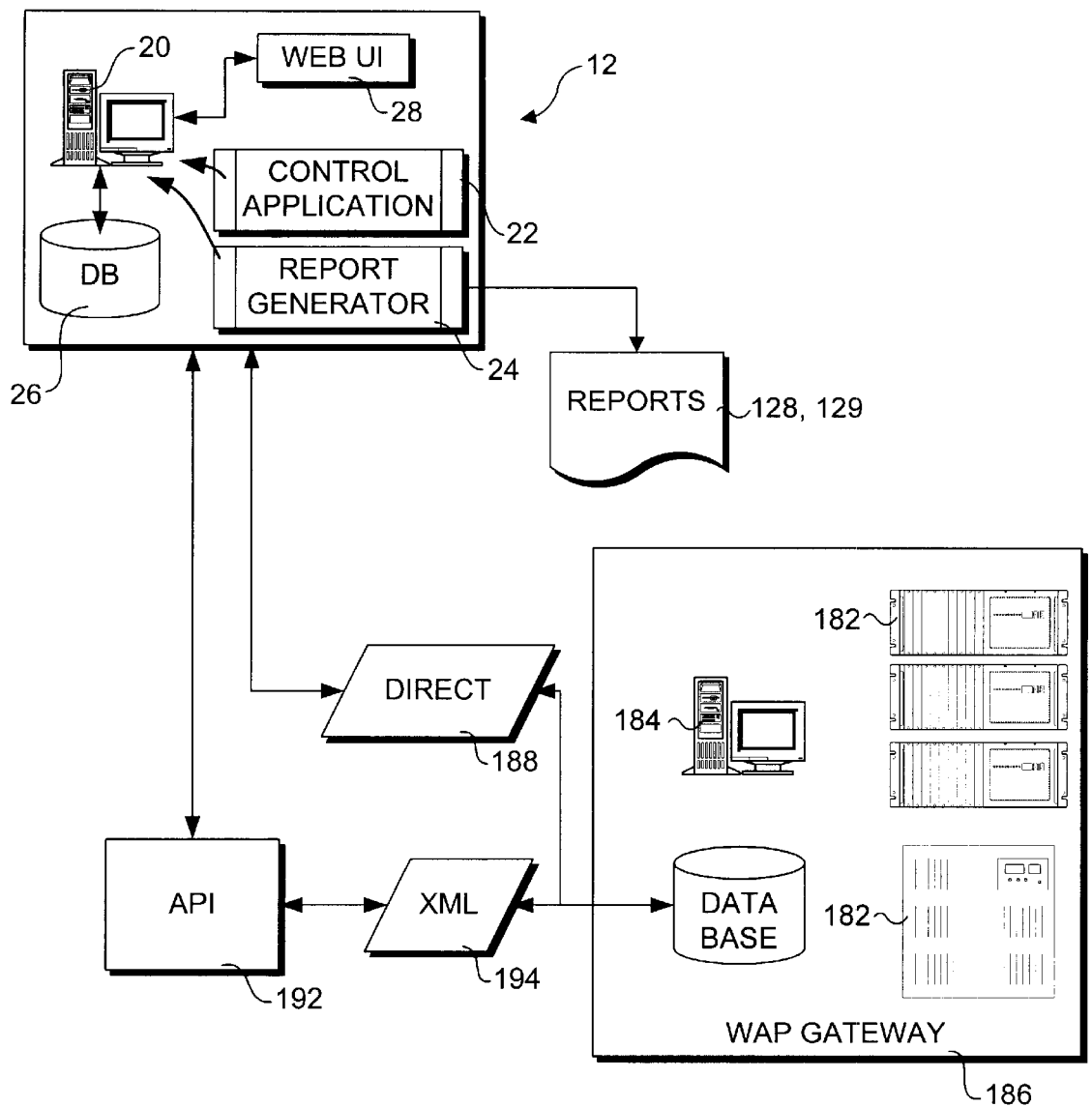
FIG. 12 is a schematic block diagram illustrating an exemplary mechanism for access performance data from network infrastructure providers.

FIG. 12 illustrates an exemplary mechanism for gathering additional performance data that is provided directly by networking equipment/elements 182 and application servers 184, as depicted by a WAP gateway 190. In one implementation, a network infrastructure providers (such as Open Wave) would allow either direct access to logged data (as depicted by direct data 188 and a database 190), or would support access to various data via queries that are facilitated via APIs 192 and XML messages 194. For example, data stored on remote database can be gathered directly via a remote database session, such as telnet session under UNIX and LINUX. Optionally, certain databases may be access remotely via built-in remote-access functionality provided by those databases, which generally requires accessing an appropriate network address along with access privileges.

Another aspect of the invention concerns built-in diagnostics. Based on various data that is gathered during the foregoing performance monitoring aspects of the invention, patterns are derived to establish performance baselines. When those baselines are deviated from, the reason is often do to a failure somewhere within the connection path. Depending on the type of deviation (e.g., a significance increase in latency or reduction in network access), one or more diagnostic tests may either be manually or automatically implemented.

Figure 13:
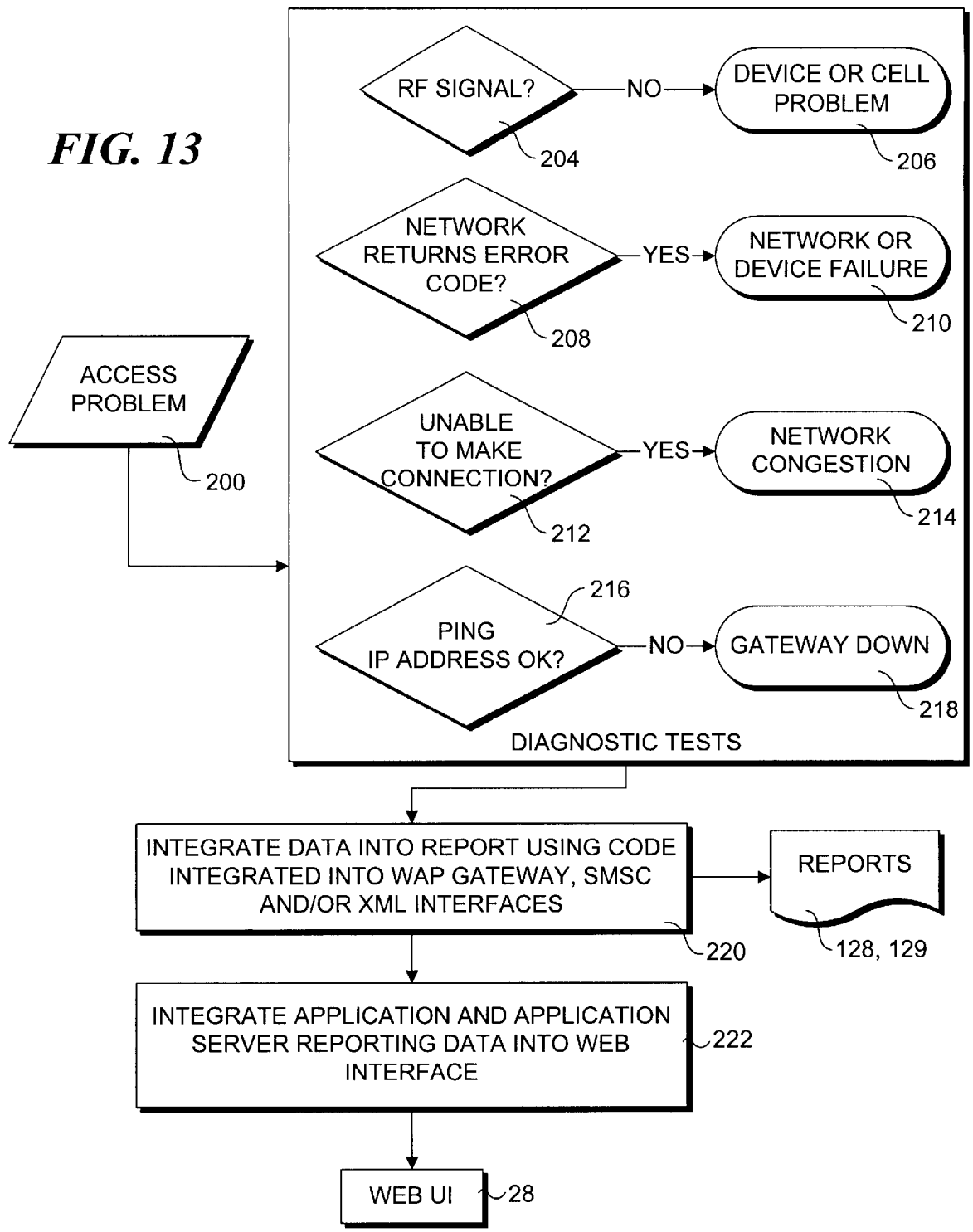
FIG. 13 is a flowchart corresponding to a set of diagnostic tests that may be performed to assist users in identifying the sources of network access problems.

For example, suppose the data indicates an access problem, as depicted by a block 200 in FIG. 13. This may automatically initiate one or more tests depicted in a diagnostic tests block 202. These test include determining if an RF signal is available, as depicted by a decision block 204. A lack of RF signal indicates there is either a problem with the cellular device or a cell it is trying to establish/maintain a connection through, as provided by a return block 206. Another test determines if the network returns an error code, as depicted by a decision block 208. Such error codes typically corresponding to a particular error caused by a device or network failure, as indicated by return block 210.

In a decision block 212, a determination is made to whether a connection cannot be established. If such a condition exists, it may be due to network congestion, as indicated by a return block 214. In other instances, there may be problems trying to access online data. One reason for this is that the WAP gateway for a particular service provider may be down. Accordingly, a "ping" test using the IP address of the service provider's WAP gateway is performed, as depicted by a decision block 216, and a gateway down message is returned in a block 218 if the address cannot be pinged.

The results of the foregoing tests into various reports using code integrated into the WAP gateway, SMSC, and/or via XML data 194 and APIs 192 in a block 220. Additionally, this reporting data is integrated into web-enabled reports in a block 222 such that various users may access electronic reports corresponding to the reporting data via WEB UI 28.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. Furthermore, it is not intended that the scope of the invention in any way be limited by the above description, but instead be determined entirely by reference to the claims that follow.

What is claimed is:

1. A method for monitoring wireless data service performance of a service provider, comprising:

generating a data message to be sent by a sending wireless device;

sending the data message to a destination wireless device via data messaging services provided by the service provider;

measuring a delivery latency corresponding to an amount of time that passes between when the data message was sent from the sending wireless device to when the data message is received by the destination wireless device; and storing data message delivery performance data corresponding to a delivery of the data message, said data identifying a first location in proximity to where the sending wireless device was when the data message was sent, a second location in proximity to where the destination wireless device was when the data message was received, a time proximate to when the data message was sent, and the delivery latency that was measured for the data message.

2. The method of claim 1, wherein the text message is generated by a computer linked in communication with the sending wireless device.

3. The method of claim 1, wherein the text message comprises a standardized message and the method further comprises:

repeatedly sending the standardized message from at least one of sending device to a plurality of destination wireless devices located at discreet locations that are serviced by the service provider;

measuring a delivery latency for each standardized message that is sent; and storing message delivery performance data corresponding to each standardized message that was sent.

4. The method of claim 3, further comprising generating performance reports comprising aggregated data corresponding to the delivery latencies that are measured.

5. The method of claim 3, further comprising:
performing the method functions of claim 3 for a plurality of service providers; and
generating performance reports comprising aggregated data corresponding to the delivery latencies that are measured, wherein said aggregated data are grouped by each service provider such that performance of the plurality of service providers can be compared.

6. The method of claim 3, wherein said at least sending device is operated from a vehicle, further comprising sending out a plurality of data messages from different locations as the vehicle is being driven.

7. The method of claim 6, wherein the vehicle is driven along a substantially predetermined route.

8. The method of claim 6, wherein the vehicle comprises one of a taxi or bus.

9. The method of claim 3, wherein the method functions are performed by automated equipment.

10. The method of claim 3, further comprising sending an alert message to the service provider in response to a delivery latency performance level that does not meet predetermined criteria.

11. The method of claim 3, further comprising:
determining if a service problem may exist; and
performing one or more diagnostic tests to determine a cause of the service problem.

12. The method of claim 11, wherein determining if a service problem exists comprises:
aggregating message delivery performance data to establish a baseline performance pattern for a given service provider; and
comparing new message delivery performance data with the baseline performance pattern to identify any significant deviations between them, said any significant deviations being indicative that a service problem exist.

13. The method of claim 1, wherein the sending device comprises one of a wireless phone, a pager, a personal digital assistant (PDA), and a pocket PC.

14. The method of claim 1, further comprising forwarding the data message delivery data to a central monitoring station.

15. The method of claim 1, wherein measuring the delivery latency comprises:
recording a sent timestamp corresponding to a time the data message is sent by the sending wireless device;
recording a received timestamp corresponding to a time the data message is received by the destination wireless device;
storing the sent timestamp and the received timestamp in a database; and
executing a query on data stored in the database corresponding to the sent timestamp and received timestamp, said query returning the delivery latency.

16. The method of claim 1, further comprising:
recording a start receive timestamp corresponding to a time the data message begins to be received by the destination wireless device;
recording an end receive timestamp corresponding to a time the data message has been completely received by the destination wireless device;
determining a size of the data message; and
calculating a data delivery rate based on the size of the data message and a time difference between the end receive timestamp and the start receive timestamp.

17. The method of claim 1, wherein the data message is delivered to the destination wireless device via a short messaging service center (SMSC), further comprising determining an SMSC processing latency based on a time the SMCS receives the data message and a time the SMSC dispatches the data message to be delivered to the destination wireless device.

18. The method of claim 1, wherein the data message is delivered to the destination wireless device via a short messaging service center (SMSC), further comprising:
recording a sent timestamp corresponding to a time the data message is sent from the sending wireless device;
recording a dispatch timestamp corresponding to a time the data message is dispatched from the SMSC; and
determining a time-to-SMSC dispatch processing latency based on a difference between the dispatch timestamp and the sent timestamp.

19. The method of claim 1, wherein the sending wireless device and destination wireless device are located in different metropolitan areas.

20. A method for monitoring wireless data service performance of a plurality of service providers that provide cross-connectivity for delivery of wireless data, comprising:
generating a data message to be sent by a sending wireless device;
sending the data message to a destination wireless device via data messaging services provided a first and second service provider;
measuring a first delivery latency corresponding to an amount of time that passes between when the data message was sent from the sending wireless device to when the data message is passed from the first service provider to the second service provider;
measuring a second delivery latency corresponding to an amount of time that passes between when the data message is passed from the first service provider to the second service provider and when the data message is received by the destination wireless device; and
storing data message delivery performance data corresponding to a delivery of the data message, said data identifying a first location in proximity to where the sending wireless device was when the data message was sent, a second location in proximity to where the destination wireless device was when the data message was received, a time proximate to when the data message was sent, an identity of the first and second service providers and the first and second delivery latencies that were measured for the data message.

21. The method of claim 20, wherein the data message is delivered to the destination wireless device via a short messaging service center (SMSC) corresponding to the first service provider, and wherein determining the first and second delivery latencies comprise:
recording a sent timestamp corresponding to a time the data message is sent by the sending wireless device;
recording a received timestamp corresponding to a time the data message is received by the destination wireless device;
recording a dispatched timestamp corresponding to a time the data message is passed from the SMSC for the first service provider to the second service provider,
wherein the first delivery latency comprises a time difference between the dispatched timestamp and the sent timestamp and the second delivery latency comprises a time difference between the received timestamp and the dispatched timestamp.

22. The method of claim 20 further comprising:
sending a plurality of data messages between sending and destination wireless devices that are serviced by at least three service provider, wherein each data message that is send is handled by two service providers, and the data messages include at least one message that is sent from a sending wireless device that is serviced by each of the service providers that is sent to a destination wireless service serviced by each of the other service providers;
determining a total delivery latency for each of the data messages comprising a time difference between when that message is sent from the sending wireless device to when the message is received by the destination wireless device;
formulating a set of equations corresponding to respective data messages that are sent, each equation containing a first variable corresponding to the service provider for the sending wireless device used to send that message and a second variable corresponding to the service provider for the destination wireless device used to receive that message; and
simultaneously solving the set of equations to resolve the values of the variables, thereby determining proportional latencies corresponding to respective portions of the total delivery latency due to each of the service providers in delivering the data messages.

23. A method for monitoring wireless Internet access service performance of a service provider, comprising:
requesting to access an Internet site using a WAP-enabled wireless device serviced by the service provider;
recording a request timestamp corresponding to a time that the request is made;
recording a delivery start timestamp corresponding to a time when data begins to be delivered to the WAP-enabled wireless device from the Internet site via the service provider;
determining a delivery latency comprising a difference between the delivery start timestamp and the request timestamp; and
storing wireless Internet access performance data corresponding to the access of data from the Internet web site that includes a location in proximity to where the WAP-enabled wireless device was when the request to access the Internet site was made, a time proximate to when the request to access the Internet site was made, and the delivery latency that was measured.

24. The method of claim 23, wherein the request to access the Internet site is generated by a computer linked in communication with the WAP-enabled wireless device.

25. The method of claim 23, further comprising:
requesting access to one or more Internet sites using a plurality of WAP-enabled wireless devices located at discreet locations;
measuring a delivery latency for each request to access said one or more Internet sites; and
storing wireless Internet access performance data corresponding to each request to access said one or more Internet sites.

26. The method of claim 25, further comprising generating performance reports comprising aggregated data corresponding to the delivery latencies that are measured.

27. The method of claim 25, further comprising:
performing the method functions of claim 25 for a plurality of service providers; and
generating performance reports comprising aggregated data corresponding to the delivery latencies that are measured, wherein said aggregated data are grouped by each service provider such that performance of the plurality of service providers can be compared.

28. The method of claim 25, wherein at least one of said plurality of WAP-enabled wireless devices is operated from a vehicle, further comprising accessing said one or more Internet sites with the WAP-enabled wireless device different locations as the vehicle is being driven.

29. The method of claim 25, further comprising sending an alert message to the service provider in response to a delivery latency performance level that does not meet a predetermined criteria.

30. The method of claim 25, further comprising:
determining if a service problem may exist; and
performing one or more diagnostic tests to determine a cause of the service problem.

31. The method of claim 30, wherein determining if a service problem exists comprises:
aggregating message delivery performance data to establish a baseline performance pattern for a given service provider; and
comparing new message delivery performance data with the baseline performance pattern to identify any significant deviations between them, said any significant deviations being indicative that a service problem exist.

32. The method of claim 23, further comprising forwarding the data message delivery data to a central monitoring station.

33. The method of claim 23, further comprising:
recording an completely delivered timestamp corresponding to a time when content from the Internet site has been completely delivered to the WAP-enabled wireless device;
determining an amount of content that is delivered; and
calculating a data delivery rate based on the amount of content that is delivered and a time difference between the completely delivered timestamp and the delivery start timestamp.

34. The method of claim 23, wherein the method functions are performed by automated equipment.

35. The method of claim 23, further comprising:
performing a scripted set of interactions with controls on the Internet site to enable a predetermined function to be performed via the WAP-enabled wireless device;
determining an execution latency corresponding to an amount of time it takes to perform the predetermined function.

36. The method of claim 35, wherein the predetermined function comprises logging on to the Internet site.

37. The method of claim 35, wherein the predetermined function comprises executing a stock trade through stock-trading services provided by the Internet site.

38. A system for monitoring wireless data service performance of one or more service providers, comprising:
a central monitoring station including a means for storing message delivery performance data; and
a plurality of remote monitoring probes located at discreet locations, each remote monitoring probe linked in communication with the central monitoring station and including:
at least one wireless messaging device that sends data messages to other remote monitoring probes and/or the central monitoring station and/or receives data messages from other remote monitoring probes and/or the central monitoring station;

means for capturing messaging delivery performance data corresponding to data messages sent by and/or received by the remote monitoring probe, said message delivery performance data including timestamps corresponding to when data messages are sent and/or received by that remote monitoring probe and an identity of the wireless messaging device that sends or receives a data message; and means for sending message delivery performance data captured by the remote monitoring probe to the central monitoring station.

39. The system of claim 38, wherein at least one of the plurality of remote monitoring probes comprises a mobile remote monitoring probe that is attached to a vehicle that is driven to different locations while that probes sends and/or receives data messages.

40. The system of claim 39, wherein said at least one remote monitoring probe further includes a position locating device that provides data identifying a location of said at least one remote monitoring probe.

41. The system of claim 38, wherein said means for capturing and sending data comprises a computer linked in communication with said at least one wireless messaging device.

42. The system of claim 41, wherein the computer runs software that automatically generates data messages that are sent from the remote monitoring probe.

43. The system of claim 41, wherein the computer runs software that automatically records message delivery performance data corresponding to data messages received by that probe.

44. The system of claim 38, wherein said at least one wireless messaging device comprises at least two different devices from among the group of a wireless cellular phone, a wireless PCS phone, a wireless pager, a personal digital assistant (PDA) and a pocket PC.

45. The system of claim 38, wherein the central monitoring station includes:

a computer running a database in which the message delivery performance data is stored; and report generation software that generates performance reports comprising aggregated data corresponding to message delivery latencies derived from message delivery performance data stored in the database.

46. The system of claim 45, wherein the computer at the central monitoring station further includes software that generates an alert to a service provider when message delivery performance data sent to the central monitoring station indicates a message delivery performance level for the service provider has fallen below a predetermined threshold.

47. The system of claim 38, wherein the means for sending data captured by a remote monitoring probe sends data to the central monitoring station on a periodic basis.

48. The system of claim 38, wherein the means for sending message delivery performance data captured by a remote monitoring probe sends the message delivery performance data to the central monitoring station as that data is captured by the remote monitoring probe.

49. A system for monitoring wireless Internet access performance of one or more service providers, comprising:

a central monitoring station including a means for storing Internet access performance data; and a plurality of remote monitoring probes located at discreet locations, each remote monitoring probe linked in communication with the central monitoring station and including:

at least one WAP-enabled wireless device that requests data from and provides data to one or more Internet sites;

means for capturing wireless Internet access performance data corresponding to wireless Internet site accesses performed by said at least one WAP-enabled wireless device, said wireless Internet access performance data including timestamps corresponding to when data is requested and received by said at least one WAP-enabled wireless device; and means for sending wireless Internet access performance data captured by the remote monitoring probe to the central monitoring station.

50. The system of claim 49, wherein at least one of the plurality of remote monitoring probes comprises a mobile remote monitoring probe that is attached to a vehicle that is driven to different locations while said at least one WAP-enabled wireless device interacts with one or more Internet sites.

51. The system of claim 50, wherein said at least one remote monitoring probe further includes a position locating device that provides data identifying a location of said at least one remote monitoring probe.

52. The system of claim 49, wherein said means for capturing and sending data comprises a computer linked in communication with said at least one WAP-enabled wireless device.

53. The system of claim 49, wherein the computer runs software that automatically controls a sequence of interactions between a WAP-enabled wireless device and an Internet site.

54. The system of claim 53, wherein the sequence of interactions comprise executing a stock trade on an Internet site that provides online stock trading services for wireless devices.

55. The system of claim 49, wherein said at least one wireless messaging device comprises at least two different devices from among the group of a wireless cellular phone, a wireless PCS phone, a wireless pager, a personal digital assistant (PDA) and a pocket PC.

56. The system of claim 49, wherein the central monitoring station includes:

a computer running a database in which the wireless Internet access performance data is stored; and report generation software that generates performance reports comprising aggregated data corresponding to wireless Internet access delivery latencies derived from wireless Internet access performance data stored in the database.

57. The system of claim 49, wherein the computer at the central monitoring station further includes software that generates an alert to a service provider when wireless Internet access performance data sent to the central monitoring station indicates a wireless Internet access performance level for the service provider has fallen below a predetermined threshold.

58. The system of claim 49, wherein the means for sending data captured by a remote monitoring probe sends data to the central monitoring station on a periodic basis.

59. The system of claim 49, wherein the means for sending message delivery performance data captured by a remote monitoring probe sends the message delivery performance data to the central monitoring station as that data is captured by the remote monitoring probe.

* * * * *